(12) United States Patent
Suzuki et al.

(10) Patent No.: US 12,479,153 B2
(45) Date of Patent: Nov. 25, 2025

(54) RESIN COMPOSITION FOR STEREOLITHOGRAPHY

(71) Applicant: KURARAY NORITAKE DENTAL INC., Kurashiki (JP)

(72) Inventors: Kenji Suzuki, Niigata (JP); Misaki Ito, Niigata (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 864 days.

(21) Appl. No.: 17/765,031

(22) PCT Filed: Sep. 30, 2020

(86) PCT No.: PCT/JP2020/037326
§ 371 (c)(1),
(2) Date: Mar. 30, 2022

(87) PCT Pub. No.: WO2021/066073
PCT Pub. Date: Apr. 8, 2021

(65) Prior Publication Data
US 2022/0371264 A1  Nov. 24, 2022

(30) Foreign Application Priority Data

Oct. 2, 2019  (JP) ................................. 2019-182385
Nov. 11, 2019  (JP) ................................. 2019-204220

(51) Int. Cl.
| | | |
|---|---|---|
| C08F 2/46 | (2006.01) | |
| A61C 7/08 | (2006.01) | |
| A61K 6/887 | (2020.01) | |
| B29C 64/124 | (2017.01) | |
| B33Y 10/00 | (2015.01) | |
| B33Y 70/00 | (2020.01) | |
| B33Y 80/00 | (2015.01) | |
| C08F 2/50 | (2006.01) | |
| C08F 283/00 | (2006.01) | |
| C08G 61/04 | (2006.01) | |
| B29K 75/00 | (2006.01) | |

(52) U.S. Cl.
CPC ............. *B29C 64/124* (2017.08); *A61C 7/08* (2013.01); *A61K 6/887* (2020.01); *B33Y 10/00* (2014.12); *B33Y 70/00* (2014.12); *B33Y 80/00* (2014.12); *C08F 2/50* (2013.01); *C08F 283/008* (2013.01); *B29K 2075/00* (2013.01)

(58) Field of Classification Search
CPC ............ C08F 222/1065; C08F 222/102; C08F 222/103; C08F 2/50; C08F 290/147; C08F 283/008; C08F 223/34; C08F 223/58; A61K 6/887; C08L 33/08; C08L 33/10; C08L 33/24; A61C 7/08; B33Y 80/00; B33Y 70/00; B33Y 10/00; B29C 64/124; B29C 2075/00

USPC .................. 522/6, 71, 1, 189, 184; 520/1
See application file for complete search history.

(56) References Cited

U.S. PATENT DOCUMENTS

| | | |
|---|---|---|
| 2016/0369029 A1 | 12/2016 | Ohmori et al. |
| 2017/0014312 A1 | 1/2017 | Suzuki |
| 2017/0335044 A1 | 11/2017 | Hayashi |
| 2018/0014919 A1 | 1/2018 | Gomi et al. |
| 2018/0244831 A1 | 8/2018 | Hirata et al. |
| 2020/0407581 A1 | 12/2020 | Kito et al. |
| 2022/0041777 A1 | 2/2022 | Ito et al. |

FOREIGN PATENT DOCUMENTS

| | | | | |
|---|---|---|---|---|
| EP | 3929224 A1 | 12/2021 | | |
| JP | S56-144478 A | 11/1981 | | |
| JP | S60-247515 A | 12/1985 | | |
| JP | 2000159621 A | 6/2000 | | |
| JP | 2010238321 A | * 10/2010 | | |
| JP | 2016098324 A | 5/2016 | | |
| JP | 2017210539 A | 11/2017 | | |
| JP | 2018048312 A | 3/2018 | | |
| JP | 2019157046 A | 9/2019 | | |
| JP | 2020076005 A | 5/2020 | | |
| JP | 2020100821 A | 7/2020 | | |
| JP | 6774659 | 10/2020 | | |
| WO | WO-2015129180 A1 | * 9/2015 | ............... | A61K 6/30 |
| WO | WO-2015129818 A1 | 9/2015 | | |
| WO | WO-2016072356 A1 | 5/2016 | | |
| WO | WO-2016125758 A1 | 8/2016 | | |
| WO | WO-2017047615 A1 | 3/2017 | | |
| WO | WO-2017169838 A1 | 10/2017 | | |
| WO | WO-2018143305 A1 | 8/2018 | | |
| WO | WO-2019189652 A1 | 10/2019 | | |
| WO | WO-2020129736 A1 | 6/2020 | | |

OTHER PUBLICATIONS

Kawada et al, JP 2010238321 Machine Translation, Oct. 21, 2010 (Year: 2010).*
Suzuki et al, WO 2015129180 Machine Translation, Sep. 3, 2015 (Year: 2015).*
Presentation of Publications issued Jun. 13, 2023 in Japanese Patent Application No. 2021-551424 (with English translation), 17 pages.
International Search Report issued Dec. 22, 2020 in PCT/JP2020/037326 (with English translation), 6 pages.
Extended European Search Report issued Sep. 27, 2023 in corresponding European Patent Application No. 20871428.7, 6 pages.

* cited by examiner

*Primary Examiner* — Jessica Whiteley
(74) *Attorney, Agent, or Firm* — Element IP, PLC

(57) ABSTRACT

The present invention provides a resin composition for stereolithography that enables easy stereolithographical fabrication; and that can produce a cured object having desirable strain recovery, desirable toughness, and desirable water resistance. The present invention relates to a resin composition for stereolithography comprising a polymerizable compound (A) whose homopolymer has a glass transition temperature (Tg) of 37° C. or higher; and a photopolymerization initiator (B), and having a tan δ at 37° C. of 0.3 or less after cure.

21 Claims, No Drawings

RESIN COMPOSITION FOR STEREOLITHOGRAPHY

TECHNICAL FIELD

The present invention relates to a resin composition for stereolithography. Specifically, the present invention enables easy stereolithographical fabrication, and can produce a three-dimensional object having desirable strain recovery, desirable toughness, and desirable water resistance. A resin composition of the present invention is particularly suited for dental mouthpieces and denture base materials.

BACKGROUND ART

Patent Literature 1 discloses a photo-solidification technique, a method that produces a three-dimensional object through repeated exposure of controlled, necessary amounts of light energy to a liquid photocurable resin to cure the resin layer-by-layer as it is supplied onto the previously cured layer. Patent Literature 2 proposes a basic method for practical Applications of this technique, and, since its proposal, many other photo-solidification techniques have been proposed.

Vat stereolithography is a technique commonly used for optical fabrication of a three-dimensional object. In this technique, a computer-controlled ultraviolet laser is selectively applied to draw the desired pattern on the surface of a liquid photocurable resin composition placed in a vat. By being cured, the resin forms a layer of a predetermined thickness, and another cured layer is continuously formed on the cured layer by applying an ultraviolet laser to the liquid photocurable resin composition supplied onto the previously cured layer in an amount necessary to form a single layer. The layering process is repeated to produce a three-dimensional object of the desired shape. This technique has attracted great interest because it enables easy and precision production of the desired three-dimensional object in a relatively short time period, even when the product has a very complex shape.

Three-dimensional objects produced by stereolithography are used in an increasingly wider range of applications, from simple concept models to more complex models such as test models and prototypes. This has created a demand for higher shape precision in these three-dimensional objects. In addition to satisfying such properties, these products are also required to have properties that are suited for their intended use. The field of dental materials is thought to greatly benefit from stereolithography because dental mouthpieces and denture bases require shapes that vary from patient to patient, aside from being complex in shape.

Various types of dental mouthpieces are available, including orthodontic aligners attached to teeth for the correction of teeth alignment, dental splints fitted to reposition the jaw, appliances worn during sleep for the treatment of sleep apnea, mouthpieces attached to teeth to reduce tooth wear due to clenching, and devices worn in the mouth to protect the stomatognathic system and the brain by reducing injuries caused when large external forces are applied to teeth and jawbones during sports activities in contact sports. In orthodontics, the use of dental mouthpieces has gained wide popularity over the last years because of aesthetics and detachability. Dental mouthpieces are also increasingly being used as appliances for the treatment of sleep apnea, which, along with other sleep disorders, has become an area of interest in the medical community.

Denture base materials are materials used for the gum as a part of a denture attached to replace missing teeth. The demand for dentures has rapidly increased in recent years because of increasing ageing populations.

Common requirements for dental mouthpieces and denture base materials include strain recovery, toughness, and water resistance. These are required particularly in orthodontic aligners, and in partial denture bases, commonly known as non-clasp dentures, that do not have metal clasp parts. A loss of strain recovery leads to a loss of orthodontic forces or shock absorption, and the fixture can no longer serve its purpose. A loss of toughness leads to discomfort, and frequent replacement is necessary when the appliance becomes susceptible to breakage. A loss of water resistance causes reduction of mechanical properties, and makes the appliance practically useless when the appliance loses orthodontic forces or shock absorption, or becomes susceptible to breakage.

Another consideration is that fabrication of dental mouthpieces, denture base materials, and appliances for the treatment of sleep apnea typically requires taking an impression of the oral cavity. However, the procedure involves discomfort, and places a burden on patients, in addition to requiring high technical skills. Recent advances in digital technology has led to approaches that make use of an intraoral optical scan for taking an oral impression, and there have been attempts to apply stereolithography techniques for shaping. For fabrication, photocurable resin compositions are used. As a rule, resin compositions that develop flexibility and water resistance are usually high in low-polarity monomers and low in curability, and cured products of such resin compositions tend to have poor strain recovery partly because of this property. Particularly, in stereolithography, light is applied for only brief time periods, and the resin composition is exposed to oxygen as it is fabricated into an object layer-by-layer. This often produces undesirable results, notably insufficient curing. Indeed, it has been difficult to satisfy all of strain recovery, toughness, and water resistance at the same time. Resin compositions are also required to have a viscosity sufficient to enable fabrication. However, low-molecular-weight monomers, when used to achieve low viscosity, tend to decrease curability, whereas many of monomers that exhibit strain recovery have high molecular weight and high viscosity. This presents itself as an issue because it leads to poor fabricability. Accordingly, it has been difficult to provide a resin composition for stereolithography that, as a whole, has low viscosity and desirable fabricability while enabling production of a cured product that is desirable in terms of properties such as strain recovery, toughness, and water resistance.

Against this background, various techniques are proposed that are intended to enable stereolithographical fabrication of a cured product having desirable toughness and water resistance. For example, Patent Literature 3 proposes a photocurable resin composition in which a (meth)acrylamide urethane oligomer, and a (meth)acrylic acid compound whose homopolymer has a high Tg are contained as essential components. However, this patent document does not describe anything about strain recovery.

CITATION LIST

Patent Literature

Patent Literature 1: JP 56(1981)-144478 A
Patent Literature 2: JP 60(1985)-247515 A
Patent Literature 3: WO2017/047615

SUMMARY OF INVENTION

Technical Problem

It is accordingly an object of the present invention to provide a resin composition for stereolithography that enables easy stereolithographical fabrication, and that can produce a cured product having desirable strain recovery, desirable toughness, and desirable water resistance. Another object of the present invention is to provide a resin composition for stereolithography that is particularly suited for dental mouthpieces and denture base materials, especially orthodontic aligners and non-clasp dentures.

Solution to Problem

Specifically, the present invention includes the following.

[1] A resin composition for stereolithography comprising a polymerizable compound (A) whose homopolymer has a glass transition temperature (Tg) of 37° C. or higher, and a photopolymerization initiator (B), and having a tan δ at 37° C. of 0.3 or less after cure.

[2] The resin composition for stereolithography according to [1], wherein the resin composition has a tan δ with a peak top temperature of 60° C. or higher after cure.

[3] The resin composition for stereolithography according to [1] or [2], wherein the resin composition further comprises a polymerizable compound (C) whose homopolymer has a glass transition temperature (Tg) of less than 37° C.

[4] The resin composition for stereolithography according to any one of [1] to [3], wherein the resin composition has a tan δ at 200° C. of 0.5 or less after cure.

[5] The resin composition for stereolithography according to any one of [1] to [4], wherein the polymerizable compound (A) comprises a monofunctional polymerizable monomer (A1).

[6] The resin composition for stereolithography according to [5], wherein the monofunctional polymerizable monomer (A1) comprises a monofunctional (meth)acrylic acid ester compound and/or a monofunctional (meth)acrylamide compound.

[7] The resin composition for stereolithography according to [6], wherein the monofunctional polymerizable monomer (A1) comprises a monofunctional (meth)acrylic acid ester compound, and the monofunctional (meth)acrylic acid ester compound comprises at least one selected from the group consisting of an aromatic ring-containing (meth)acrylic acid ester compound, an alicyclic (meth)acrylic acid ester compound, and a nitrogen atom-containing cyclic (meth)acrylic acid ester compound.

[8] The resin composition for stereolithography according to [7], wherein the monofunctional (meth)acrylic acid ester compound comprises a nitrogen atom-containing cyclic (meth)acrylic acid ester compound.

[9] The resin composition for stereolithography according to [8], wherein the nitrogen atom-containing cyclic (meth)acrylic acid ester compound comprises at least one selected from the group consisting of pentamethyl piperidinyl (meth)acrylate, tetramethyl piperidinyl (meth)acrylate, and 4-(pyrimidin-2-yl)piperazin-1-yl (meth)acrylate.

[10] The resin composition for stereolithography according to any one of [1] to [9], wherein the polymerizable compound (A) comprises a polyfunctional polymerizable monomer (A2).

[11] The resin composition for stereolithography according to [10], wherein the polyfunctional polymerizable monomer (A2) comprises an aliphatic polyfunctional polymerizable monomer.

[12] The resin composition for stereolithography according to [10], wherein the polyfunctional polymerizable monomer (A2) comprises an alicyclic polyfunctional polymerizable monomer.

[13] The resin composition for stereolithography according to [12], wherein the alicyclic polyfunctional polymerizable monomer comprises a tricyclodecane dimethanol di(meth)acrylate.

[14] The resin composition for stereolithography according to any one of [10] to [13], wherein the polyfunctional polymerizable monomer (A2) comprises a hetero ring-containing polyfunctional polymerizable monomer.

[15] The resin composition for stereolithography according to any one of [3] to [14], wherein the polymerizable compound (C) comprises a urethanized (meth)acrylic compound (C1).

[16] The resin composition for stereolithography according to [15], wherein the urethanized (meth)acrylic compound (C1) is a (meth)acrylate comprising, per molecule,
at least one structure selected from the group consisting of a polyester, a polycarbonate, a polyurethane, a polyether, a poly-conjugated diene, and a hydrogenated poly-conjugated diene; and
a urethane bond.

[17] The resin composition for stereolithography according to [15] or [16], wherein the urethanized (meth)acrylic compound (C1) is a (meth)acrylate comprising, per molecule,
at least one polyol moiety selected from the group consisting of a polyester, a polycarbonate, a polyurethane, a polyether, a poly-conjugated diene, and a hydrogenated poly-conjugated diene each having a structure derived from a C4 to C18 aliphatic diol unit having a branched structure; and
a urethane bond.

[18] A dental material comprising a cured product of a resin composition for stereolithography of any one of [1] to [17].

[19] A dental mouthpiece comprising a cured product of a resin composition for stereolithography of any one of [1] to [17].

[20] A denture base material comprising a cured product of a resin composition for stereolithography of any one of [1] to [17].

[21] A material for treating sleep disorder, comprising a cured product of a resin composition for stereolithography of any one of [1] to [17].

[22] A method for stereolithographically producing a three-dimensional object with a resin composition for stereolithography of any one of [1] to [17].

Advantageous Effects of Invention

A resin composition for stereolithography of the present invention enables easy fabrication, and can produce a cured object having desirable strain recovery, desirable toughness, and desirable water resistance. A resin composition for stereolithography of the present invention can be suitably used for dental materials (particularly, dental mouthpieces and denture base materials, especially orthodontic aligners and non-clasp dentures), or materials for treating various types of sleep disorders (particularly, appliances for treating sleep apnea).

DESCRIPTION OF EMBODIMENTS

A resin composition for stereolithography of the present invention comprises a polymerizable compound (A) whose homopolymer has a glass transition temperature (Tg) of 37° C. or higher, and a photopolymerization initiator (B), and has a tan δ at 37° C. of 0.3 or less after cure.

In view of strain recovery, a cured product of a resin composition for stereolithography of the present invention needs to have a tan δ (loss tangent) at 37° C. of 0.3 or less, and has a tan δ at 37° C. of preferably 0.2 or less, more preferably 0.1 or less. Here, the tan δ at 37° C. of a cured product indicates the viscoelasticity of the cured product at 37° C., and is a value represented by the following formula. A cured product having a low tan δ value at 37° C. means that the cured product has a low viscosity and a high elasticity, and can more easily maintain its shape.

$$\tan \delta = E''/E',$$

where E" represents the loss elastic modulus, and E' represents the storage elastic modulus.

A cured product of a resin composition for stereolithography can effectively have a smaller tan δ at 37° C. when the peak top of tan δ shifts toward higher temperatures or lower temperatures from 37° C. However, a polymerizable compound showing a tan δ peak with the top of the peak occurring at a temperature far from 37° C. in the form of a homopolymer does not necessarily have a low tan δ at 37° C., and many other factors are involved in an intricate fashion, including, for example, copolymerizability of polymerizable compounds contained in the composition, Tg and the fraction of the homopolymer, the density of polymerizable groups in the composition, crosslink density, and compatibility with additives such as a polymerization initiator and a polymerization inhibitor. The method of measurement of tan δ at 37° C. used in the present invention will be described in detail in the EXAMPLES section below.

In view of strain recovery and toughness, a cured product of a resin composition for stereolithography of the present invention has a tan δ with a peak top temperature of preferably 60° C. or higher, more preferably 80° C. or higher, even more preferably 100° C. or higher. The peak top temperature of tan δ means a restraining force at a physical crosslinking point (restraining point). That is, a tan δ with a higher peak top temperature means that the restraining force at the physical crosslinking point is higher, meaning that the network structure of the cured product is less likely to break under stress, and the cured product has desirable shape stability. In order for a cured product of the resin composition for stereolithography to have a tan δ with a peak top temperature of 60° C. or higher, it is effective to contain a polymerizable compound whose homopolymer has a high Tg. However, simply containing a polymerizable compound whose homopolymer has a high Tg involves a possibility of making the cured product brittle. One way of avoiding this is to additionally contain a polymerizable compound whose homopolymer has a low Tg. It should be noted, however, that multiple factors are intricately involved in the peak top temperature of tan δ, including, for example, copolymerizability of a polymerizable compound whose homopolymer has a high Tg with a polymerizable compound whose homopolymer has a low Tg, and compatibility with additives such as a polymerization initiator and a polymerization inhibitor. The method of measurement of peak top temperature of tan δ used in the present invention will be described in detail in the EXAMPLES section below.

In view of strain recovery and strength, a cured product of a resin composition for stereolithography of the present invention has a tan δ at 200° C. of preferably 0.5 or less, more preferably 0.4 or less, even more preferably 0.3 or less. The tan δ at 200° C. of the cured product tends to indicate the crosslinking point (crosslink density) due to covalent (chemical) bonding. When the cured product has a crosslinking point due to covalent (chemical) bonding, tan δ tends to decrease as a result of increased storage elastic modulus in a high temperature range. That is, a cured product having a tan δ at 200° C. of 0.5 or less means that the crosslinking points include both physical and chemical crosslinks to such an extent that there is no embrittlement of the cured product, meaning that the cured product has even more desirable shape stability. In order for a cured product of the resin composition for stereolithography to have a tan δ at 200° C. of 0.5 or less, it is effective to contain a bi- or higher-functional polymerizable compound. However, simply containing a bi- or higher-functional polymerizable compound involves a possibility of making the cured product brittle. One way of avoiding this is to additionally contain a polymerizable compound whose homopolymer has a low Tg, or to control the molecular weight or the number of functional groups of the bi- or higher-functional polymerizable compound. It should be noted, however, that multiple factors are intricately involved in tan δ at 200° C., including, for example, copolymerizability of polymerizable compounds contained in the composition, and crosslink density. The method of measurement of tan δ at 200° C. used in the present invention will be described in detail in the EXAMPLES section below.

Taken together, the present invention can optimally provide a resin composition for stereolithography that particularly excels in strain recovery while having desirable fabricability, desirable toughness, and desirable water resistance when the resin composition satisfies all of a tan δ at 37° C. of 0.3 or less, a tan δ with a peak top temperature of 60° C. or higher, and a tan δ at 200° C. of 0.5 or less after cure. As discussed above, in order to provide the desirable viscoelasticity, it is important to select conditions taking into consideration the type, content, and atomic composition of the polymerizable compounds contained in the composition, as well as other components of the composition. A resin composition for stereolithography of the present invention is now described below in detail. In the present specification, the upper limits and lower limits of numeric ranges (for example, ranges of contents of components, ranges of values calculated from components, and numeric ranges of physical properties) can be combined appropriately.

Polymerizable Compound (A) Whose Homopolymer has a Tg of 37° C. or Higher

With a resin composition for stereolithography of the present invention containing a polymerizable compound (A) whose homopolymer has a Tg of 37° C. or higher (hereinafter, also referred to simply as "polymerizable compound (A)"), a three-dimensional object after photoirradiation can have improved Tg, which enables further improvement of internal cohesion, and provides the three-dimensional object with desirable strain recovery and strength.

In the present invention, it is important that when the polymerizable compound (A) is in the form of homopolymer a Tg of the homopolymer have 37° C. or higher. By the Tg of 37° C. or higher, a rigid structure is introduced, and a three-dimensional object having desirable strain recovery and strength can be formed. The Tg of the homopolymer is preferably 60° C. or higher, more preferably 80° C. or higher, even more preferably 100° C. or higher. The upper limit is not particularly limited; however, the Tg of the homopolymer is preferably 400° C. or less, more preferably 300° C. or less, even more preferably 250° C. or less. The polymerizable compound (A) may be used alone, or two or more thereof may be used in combination. In the present invention, the Tg of compounds can be measured using a known method with a device such as a viscoelasticity meter (rheometer) or a differential scanning calorimeter (DSC). For example, the glass transition temperature (Tg) can be measured by measuring the dynamic viscoelasticity of a compound (for example, a homopolymer of polymerizable compound (A)) with a rotary rheometer (AR 2000 manufactured by TA Instruments Japan Inc.), and finding the temperature at which tan δ shows a peak in the dynamic viscoelasticity measurement performed at 10 Hz frequency under a 10 N load with 0.1 displacement and 20 µNm torque.

As used herein, "polymerizable compound" means a compound containing a polymerizable group such as a (meth)acryloyl group, a vinyl group, or a styrene group, and the polymerizable compound may be a monomer, a dimer, or a polymer, as long as it contains a polymerizable group. In the present invention, the polymerizable compound (A) may use a monofunctional polymerizable monomer (A1) having one polymerizable group, and/or a polyfunctional polymerizable monomer (A2) having two or more polymerizable groups. In view of providing desirable toughness for the cured product obtained, it is preferable to contain a monofunctional polymerizable monomer (A1), more preferably a monofunctional (meth)acrylic acid ester compound and/or a monofunctional (meth)acrylamide. The term "(meth)acryl" as used in the present specification is intended to be inclusive of both methacryl and acryl. The same applies to similar expressions such as "(meth)acryloyl" and "(meth)acrylate".

Examples of the monofunctional polymerizable monomer (A1) include monofunctional (meth)acrylic acid ester compounds such as aromatic ring-containing (meth)acrylic acid ester compounds, alicyclic (meth)acrylic acid ester compounds, and nitrogen atom-containing cyclic (meth)acrylic acid ester compounds; and monofunctional (meth)acrylamide compounds such as cyclic (meth)acrylamide compounds. The monofunctional polymerizable monomer (A1) may be used alone, or two or more thereof may be used in combination.

Examples of the aromatic ring-containing (meth)acrylic acid ester compounds include monofunctional (meth)acrylic acid ester compounds having two or more aromatic rings, for example, such as o-phenylphenol (meth)acrylate, m-phenylphenol (meth)acrylate, p-phenylphenol (meth)acrylate, phenyl (meth)acrylate, 4-biphenylyl (meth)acrylate, 1-naphthyl (meth)acrylate, 2-naphthyl (meth)acrylate, anthryl (meth)acrylate, o-2-propenylphenyl (meth)acrylate, benzhydrol (meth)acrylate, cumylphenol (meth)acrylate, fluorenyl (meth)acrylate, and fluorenylmethyl (meth)acrylate.

Examples of the alicyclic (meth)acrylic acid ester compounds include 2-(1-adamantyl)propyl (meth)acrylate, 2-methyladamantyl-2-yl(meth)acrylate, 2-ethyladamantyl-2-yl(meth)acrylate, 2-n-propyladamantyl-2-yl(meth)acrylate, 2-isopropyladamantyl-2-yl(meth)acrylate, 1-(adamantan-1-yl)-1-methylethyl (meth)acrylate, 1-(adamantan-1-yl)-1-ethylethyl (meth)acrylate, 1-(adamantan-1-yl)-1-methylpropyl (meth)acrylate, and 1-(adamantan-1-yl)-1-ethylpropyl (meth)acrylate.

Examples of the nitrogen atom-containing cyclic (meth)acrylic acid ester compounds include monofunctional (meth)acrylic acid ester compounds having a hetero ring containing only nitrogen atoms as heteroatoms, for example, such as pentamethyl piperidinyl (meth)acrylate, tetramethyl piperidinyl (meth)acrylate, and 4-(pyrimidin-2-yl)piperazin-1-yl(meth)acrylate. These may be used alone, or two or more thereof may be used in combination.

Examples of the cyclic (meth)acrylamide compounds include N-(meth)acryloylmorpholine, N-(meth)acryloylpyrrolidine, N-(meth)acryloylpiperidine, N-(meth)acryloyl-2-methylpiperidine, and N-(meth)acryloyl-2,2,6,6-tetramethylpiperidine.

In view of providing desirable strain recovery and strength for a cured product of a resin composition for stereolithography of the present invention, preferred as monofunctional polymerizable monomer (A1) are N-(meth)acryloylmorpholine, fluorenyl (meth)acrylate, fluorenylmethyl (meth)acrylate, phenyl (meth)acrylate, 4-biphenylyl (meth)acrylate, 1-naphthyl (meth)acrylate, 2-naphthyl (meth)acrylate, anthryl (meth)acrylate, benzhydrol (meth)acrylate, cumylphenol (meth)acrylate, N-acryloylmorpholine, piperidylacrylamide, tetramethylpiperidylacrylamide, pentamethyl piperidinyl (meth)acrylate, and tetramethyl piperidinyl (meth)acrylate, more preferably fluorenyl (meth)acrylate, fluorenylmethyl (meth)acrylate, 4-biphenylyl (meth)acrylate, 1-naphthyl (meth)acrylate, 2-naphthyl (meth)acrylate, benzhydrol (meth)acrylate, cumylphenol (meth)acrylate, piperidylacrylamide, tetramethylpiperidylacrylamide, pentamethyl piperidinyl (meth)acrylate, and tetramethyl piperidinyl (meth)acrylate, even more preferably fluorenyl (meth)acrylate, fluorenylmethyl (meth)acrylate, 4-biphenylyl (meth)acrylate, piperidylacrylamide, and tetramethylpiperidylacrylamide.

Examples of the polyfunctional polymerizable monomer (A2) include aliphatic polyfunctional polymerizable monomers having no cyclic structure, and polyfunctional polymerizable monomers having a cyclic structure. The cyclic structure is not particularly limited, as long as the present invention can exhibit its effects.

Examples of the cyclic structure include:
single aromatic rings such as a benzene ring, a biphenyl ring, and a triphenylmethyl ring;
fused bicyclic aromatic rings such as a naphthalene ring, a pentalene ring, an indene ring, an indane ring, a tetralin ring, and an azulene ring; and
fused tricyclic hydrocarbons such as an as-indacene ring, an s-indacene ring, an acenaphthylene ring, an acenaphthene ring, a fluorene ring, a phenalene ring, a perinaphthene ring, a phenanthrene ring, and an anthracene ring.
saturated hydrocarbon rings such as a norbornane ring, a tetracyclododecanyl ring, an adamantane ring, a dicyclopentenyl ring, a tricyclododecanyl ring, a cyclopentane ring, a cyclohexane ring, a cycloheptane ring, a cyclooctane ring, and a cyclodecane ring;
unsaturated hydrocarbon rings such as a norbornene ring, a tetralin ring, and a fluorene ring;
saturated monocyclic rings having one nitrogen atom, such as a pyrrolidine ring and a piperidine ring;
saturated monocyclic rings having two or more nitrogen atoms, such as a piperazine ring, a methenamine ring, and an isocyanurate ring;
unsaturated monocyclic rings having one nitrogen atom such as a pyrrole ring and a pyridine ring;
unsaturated monocyclic rings having two or more nitrogen atoms, such as an imidazole ring, an indazole ring, an imidazoline ring, a pyrazole ring, a pyrazine ring, a pyrimidine ring, a triazole ring, a triazine ring, and a tetrazole ring;

unsaturated polycyclic rings having one nitrogen atom, such as an indole ring, an isoindole ring, a quinoline ring, an isoquinoline ring, and a carbazole ring;

heterocyclic rings having only a nitrogen atom, as represented by unsaturated polycyclic rings having two or more nitrogen atoms, for example, such as a benzoimidazole ring, a purine ring, a benzotriazole ring, and a choline ring;

heterocyclic rings having a nitrogen atom and an oxygen atom, such as a morpholine ring, a lactam ring, an oxazole ring, a benzooxazine ring, a hydantoin ring, and a phthalocyanine ring; and heterocyclic rings having a nitrogen atom and a sulfur atom, such as a thiazole ring, a thiazine ring, and a phenothiazine ring.

In view of curability and the strain recovery, toughness, and water resistance of a cured product of the resin composition for stereolithography, preferred are single aromatic rings, fused bicyclic aromatic rings, fused tricyclic hydrocarbons, saturated hydrocarbon rings, saturated monocyclic rings having one nitrogen atom, saturated monocyclic rings having two or more nitrogen atoms, and heterocyclic rings having a nitrogen atom and an oxygen atom, more preferably single aromatic rings, fused bicyclic aromatic rings, saturated hydrocarbon rings, unsaturated hydrocarbon rings, and saturated monocyclic rings having one nitrogen atom, even more preferably single aromatic rings, saturated hydrocarbon rings, unsaturated hydrocarbon rings, saturated monocyclic rings having one nitrogen atom, and saturated monocyclic rings having two or more nitrogen atoms.

In view of providing desirable strain recovery, water resistance, and strength for the cured product, examples of the polyfunctional polymerizable monomer (A2) include:

bifunctional (meth)acrylic acid ester compounds such as 1,2-butylene glycol di(meth)acrylate, 1,3-propylene glycol di(meth)acrylate, 1,4-butylene glycol di(meth)acrylate, neopentyl glycol di(meth)acrylate, triethylene glycol di(meth)acrylate, dipropylene glycol di(meth)acrylate, tripropylene glycol di(meth)acrylate, and dodecane di(meth)acrylate;

aliphatic polyfunctional polymerizable monomers, for example, tri- and higher-functional (meth)acrylic acid ester compounds such as trimethylolpropane tri(meth)acrylate, pentaerythritol tri(meth)acrylate, and pentaerythritol tetra(meth)acrylate;

aromatic ring-containing polyfunctional polymerizable monomers such as ethoxylated bisphenol A di(meth)acrylate (number of ethylene oxide (EO) added: 3 mol %);

alicyclic polyfunctional polymerizable monomers such as 1,4-cyclohexane dimethanol di(meth)acrylate, dicyclopentanyl di(meth)acrylate, isobornyl di(meth)acrylate, hydrogenated bisphenol A di(meth)acrylate, and tricyclodecane dimethanol di(meth)acrylate; and hetero ring-containing polyfunctional polymerizable monomers such as tris(2-hydroxyethyl)isocyanurate tri(meth)acrylate.

The polyfunctional polymerizable monomer (A2) may be used alone, or two or more thereof may be used in combination.

A preferred embodiment of the present invention is, for example, a resin composition for stereolithography in which the polymerizable compound (A) comprises a monofunctional polymerizable monomer (A1) and a polyfunctional polymerizable monomer (A2). By containing a polyfunctional polymerizable monomer (A2), the resin composition for stereolithography can exhibit a reduced tan δ value at 200° C. when combined with other components, though this is not always achievable.

The content of polymerizable compound (A) in a resin composition for stereolithography of the present invention is preferably 30 to 95 mass % of the total amount of polymerizable compound (A), polymerizable compound (C) (described later), and other polymerizable compounds (in the following, these three types of polymerizable compounds will also be collectively referred to simply as "polymerizable compounds"). In view of improving fabricability and providing a cured product having more desirable strain recovery and strength, the content of polymerizable compound (A) is more preferably 35 mass % or more, even more preferably 50 mass % or more of the total amount. In view of improving fabricability and providing a cured product having more desirable strain recovery and strength, the content of polymerizable compound (A) is more preferably 90 mass % or less, even more preferably 80 mass % or less of the total amount.

Photopolymerization Initiator (B)

The photopolymerization initiator (B) used in the present invention may be selected from photopolymerization initiators used in industry, preferably from photopolymerization initiators used in dentistry.

Examples of the photopolymerization initiator (B) include (bis)acylphosphine oxides, thioxanthones or quaternary ammonium salts of thioxanthones, ketals, α-diketones, coumarins, anthraquinones, benzoin alkyl ether compounds, an α-aminoketone compounds, and germanium compounds. The photopolymerization initiator (B) may be used alone, or two or more thereof may be used in combination.

Preferably, the photopolymerization initiator (B) is at least one selected from the group consisting of (bis)acylphosphine oxides and α-diketones. In this way, a resin composition for stereolithography can be obtained that has desirable photocurability both in the ultraviolet and visible regions, and that shows sufficient photocurability even when the light source is a laser, a halogen lamp, a light emitting diode (LED), or a xenon lamp.

Examples of acylphosphine oxides in the (bis)acylphosphine oxides include 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, benzoyl di(2,6-dimethylphenyl)phosphonate, sodium salts of 2,4,6-trimethylbenzoylphenylphosphine oxide, potassium salts of 2,4,6-trimethylbenzoylphenylphosphine oxide, and ammonium salts of 2,4,6-trimethylbenzoyldiphenylphosphine oxide. Examples of bisacylphosphine oxides include bis(2,6-dichlorobenzoyl)phenylphosphine oxide, bis(2,6-dichlorobenzoyl)-2,5-dimethylphenylphosphine oxide, bis(2,6-dichlorobenzoyl)-4-propylphenylphosphine oxide, bis(2,6-dichlorobenzoyl)-1-naphthylphosphine oxide, bis(2,6-dimethoxybenzoyl)phenylphosphine oxide, bis(2,6-dimethoxybenzoyl)-2,4,4-trimethylpentylphosphine oxide, bis(2,6-dimethoxybenzoyl)-2,5-dimethylphenylphosphine oxide, bis(2,4,6-trimethylbenzoyl)phenylphosphine oxide, and bis(2,5,6-trimethylbenzoyl)-2,4,4-trimethylpentylphosphine oxide. Other examples include compounds mentioned in JP 2000-159621 A.

Among these (bis)acylphosphine oxides, particularly preferred as photopolymerization initiator (B) are 2,4,6-trimethylbenzoyldiphenylphosphine oxide, 2,4,6-trimethylbenzoylmethoxyphenylphosphine oxide, bis(2,4,6-trimethylbenzoyl)phenylphosphine oxide, and sodium salts of 2,4,6-trimethylbenzoylphenylphosphine oxide.

Examples of the α-diketones include diacetyl, benzyl, camphorquinone, 2,3-pentadione, 2,3-octadione, 9,10-phenanthrenequinone, 4,4'-oxybenzyl, and acenaphthenequinone. Camphorquinone is particularly preferred when the light source used is a visible-light source.

Examples of the germanium compounds include monoacyl germanium compounds such as benzoyltrimethylgermanium(IV); and diacyl germanium compounds such as dibenzoyldiethylgermanium, and bis(4-methoxybenzoyl)diethylgermanium.

The content of the photopolymerization initiator (B) in a resin composition for stereolithography of the present invention is not particularly limited, as long as the present invention can exhibit its effects. However, in view of curability and other properties of the resin composition for stereolithography, the content of photopolymerization initiator (B) is preferably 0.01 to 20 parts by mass relative to total 100 parts by mass of the polymerizable compounds. When the content of photopolymerization initiator (B) is less than 0.01 parts by mass, polymerization may not sufficiently proceed to form a three-dimensional object. The content of photopolymerization initiator (B) is more preferably 0.05 parts by mass or more, even more preferably 0.1 parts by mass or more, particularly preferably 0.5 parts by mass or more relative to total 100 parts by mass of the polymerizable compounds. When the content of photopolymerization initiator (B) is more than 20 parts by mass, the photopolymerization initiator (B) may precipitate out of the resin composition for stereolithography when the solubility of the photopolymerization initiator itself is low. The content of photopolymerization initiator (B) is more preferably 15 parts by mass or less, even more preferably 10 parts by mass or less, particularly preferably 5.0 parts by mass or less relative to total 100 parts by mass of the polymerizable compounds.

Polymerizable Compound (C) Whose Homopolymer has a Tg of Less than 37° C.

Preferably, a resin composition for stereolithography of the present invention comprises a polymerizable compound (C) whose homopolymer has a Tg of less than 37° C. (hereinafter, also referred to simply as "polymerizable compound (C)"). A resin composition for stereolithography of the present invention uses the polymerizable compound (C) to impart even more flexibility and water resistance to a cured product of the resin composition for stereolithography.

In the present invention, the polymerizable compound (C) may use a monofunctional polymerizable monomer having one polymerizable group, and/or a polyfunctional polymerizable monomer having two or more polymerizable groups. Examples of the polymerizable compound (C) include a monofunctional or polyfunctional urethanized (meth)acrylic compound (C1) (hereinafter, referred to simply as "urethanized (meth)acrylic compound (C1)"), and a monofunctional or polyfunctional (meth)acrylic acid ester compound (C2) having no urethane bond (hereinafter, referred to simply as "(meth)acrylic acid ester compound (C2)"). In view of providing desirable curability to the resin composition for stereolithography, the polymerizable compound (C) preferably comprises a monofunctional or polyfunctional urethanized (meth)acrylic compound (C1). In view of providing desirable toughness and water resistance to the cured product obtained, the polymerizable compound (C) preferably comprises a polyfunctional urethanized (meth)acrylic compound. The polymerizable compound (C) may be used alone, or two or more thereof may be used in combination.

It is important in the present invention that that when the polymerizable compound (C) is in the form of homopolymer a Tg of the homopolymer have less than 37° C. By the Tg of less than 37° C., a moderately flexible structure is introduced, and a three-dimensional object having desirable toughness can be formed. In view of toughness, the Tg of the homopolymer of polymerizable compound (C) is preferably 25° C. or less, more preferably 15° C. or less.

Examples of the monofunctional (meth)acrylic acid ester compound (C2) include:

aromatic ring-containing monofunctional (meth)acrylic acid ester compounds, for example, such as ethoxylated-o-phenylphenol (meth)acrylate, ethoxylated-m-phenylphenol (meth)acrylate, ethoxylated-p-phenylphenol (meth)acrylate, propoxylated-o-phenylphenol (meth)acrylate, propoxylated-m-phenylphenol (meth)acrylate, propoxylated-p-phenylphenol (meth)acrylate, butoxylated-o-phenylphenol (meth)acrylate, butoxylated-m-phenylphenol (meth)acrylate, butoxylated-p-phenylphenol (meth)acrylate, o-phenoxybenzyl (meth)acrylate, m-phenoxybenzyl (meth)acrylate, p-phenoxybenzyl (meth)acrylate, 2-(o-phenoxyphenyl)ethyl (meth)acrylate, 2-(m-phenoxyphenyl)ethyl (meth)acrylate, 2-(p-phenoxyphenyl)ethyl (meth)acrylate, 3-(o-phenoxyphenyl)propyl (meth)acrylate, 3-(m-phenoxyphenyl)propyl (meth)acrylate, 3-(p-phenoxyphenyl)propyl (meth)acrylate, 4-(o-phenoxyphenyl)butyl (meth)acrylate, 4-(m-phenoxyphenyl)butyl (meth)acrylate, 4-(p-phenoxyphenyl)butyl (meth)acrylate, 5-(o-phenoxyphenyl)pentyl (meth)acrylate, 5-(m-phenoxyphenyl)pentyl (meth)acrylate, 5-(p-phenoxyphenyl)pentyl (meth)acrylate, 6-(o-phenoxyphenyl)hexyl (meth)acrylate, 6-(m-phenoxyphenyl)hexyl (meth)acrylate, and 6-(p-phenoxyphenyl)hexyl (meth)acrylate;

aliphatic monofunctional (meth)acrylic acid ester compounds, for example, such as undecyl (meth)acrylate, lauryl (meth)acrylate, tridecyl (meth)acrylate, tetradecyl (meth)acrylate, pentadecyl (meth)acrylate, cetyl (meth)acrylate, palmitoleyl (meth)acrylate, heptadecyl (meth)acrylate, oleyl (meth)acrylate, stearyl (meth)acrylate, isostearyl (meth)acrylate, 4-hydroxybutyl (meth)acrylate, 6-hydroxyhexyl (meth)acrylate, 10-hydroxydecyl (meth)acrylate, glycerol mono(meth)acrylate, and erythritol mono(meth)acrylate; and hetero ring-containing monofunctional (meth)acrylic acid ester compounds, for example, such as 1,2,2,6,6-pentamethyl-4-piperidyl (meth)acrylate, and 2,2,6,6-tetramethyl-4-piperidyl (meth)acrylate.

These may be used alone, or two or more thereof may be used in combination. In view of providing desirable curability to the resin composition for stereolithography and desirable toughness to the cured product, preferred are monofunctional (meth)acrylic acid ester compounds having an aromatic ring, more preferably o-phenoxybenzylacrylate, m-phenoxybenzylacrylate, p-phenoxybenzylacrylate, 2-(o-phenoxyphenyl)ethylacrylate, 2-(m-phenoxyphenyl)ethylacrylate, 2-(p-phenoxyphenyl)ethylacrylate, ethoxylated-o-phenylphenol (meth)acrylate, ethoxylated-m-phenylphenol (meth)acrylate, ethoxylated-p-phenylphenol (meth)acrylate, even more preferably o-phenoxybenzylacrylate, m-phenoxybenzylacrylate, p-phenoxybenzylacrylate, and ethoxylated-o-phenylphenol (meth)acrylate, particularly preferably o-phenoxybenzylacrylate, m-phenoxybenzylacrylate, and ethoxylated-o-phenylphenol (meth)acrylate, most preferably m-phenoxybenzylacrylate and ethoxylated-o-phenylphenol (meth)acrylate.

Examples of polyfunctional (meth)acrylic acid ester compound (C2) include tetraethylene glycol di(meth)acrylate, polyethylene glycol di(meth)acrylate, cyclohexane dimethanol di(meth)acrylate, alkoxylated hexanediol di(meth)acrylate, ethoxylated bisphenol A di(meth)acrylate (number of ethylene oxide (EO) added: 10 mol %), ethoxylated bisphenol A di(meth)acrylate (number of EO added: 20 mol %), and ethoxylated neopentyl glycol di(meth)acrylate.

The content of the polymerizable compound (C) in a resin composition for stereolithography of the present invention is preferably 1 to 69 mass % of the total amount of the polymerizable compounds. In view of improving fabricability and providing a cured product having improved flexibility, toughness, and water resistance, the content of polymerizable compound (C) is more preferably 2.5 mass % or more, even more preferably 5 mass % or more of the total amount. In view of improving fabricability and providing a cured product having improved flexibility, toughness, and water resistance, the content of polymerizable compound (C) is more preferably 65 mass % or less, even more preferably 50 mass % or less.

In the present invention, the urethanized (meth)acrylic compound (C1) can be easily synthesized by, for example, an addition reaction of a polyol containing a polymer backbone, a compound having an isocyanate group (—NCO), and a (meth)acrylic compound having a hydroxyl group (—OH) (these will be described later). Alternatively, the urethanized (meth)acrylic compound (C1) can be easily synthesized by a ring-opening addition reaction of a hydroxyl group-containing (meth)acrylic compound with lactone or alkylene oxide, followed by an addition reaction in which the resulting compound having a hydroxyl group at one of the terminals reacts with a compound having an isocyanate group.

Preferably, the urethanized (meth)acrylic compound (C1) is a (meth)acrylate comprising, per molecule, at least one structure (polymer backbone) selected from the group consisting of a polyester, a polycarbonate, a polyurethane, a polyether, a poly-conjugated diene, and a hydrogenated poly-conjugated diene; and a urethane bond. More preferably, the urethanized (meth)acrylic compound (C1) is a (meth)acrylate comprising, within the molecule, at least one polyol moiety selected from the group consisting of a polyester, a polycarbonate, a polyurethane, a polyether, a poly-conjugated diene, and a hydrogenated poly-conjugated diene each having a structure derived from a C4 to C18 aliphatic diol unit having a branched structure; and a urethane bond.

Examples of the polyester structure include: a polymer of a dicarboxylic acid (e.g., an aromatic dicarboxylic acid such as isophthalic acid or isophthalic acid, or an unsaturated aliphatic dicarboxylic acid such as maleic acid) and an aliphatic diol having 2 to 18 carbon atoms; a polymer of a dicarboxylic acid (e.g., a saturated aliphatic dicarboxylic acid such as adipic acid or sebacic acid) and an aliphatic diol having 2 to 18 carbon atoms; a β-propiolactone polymer; a γ-butyrolactone polymer; a δ-valerolactone polymer; an ε-caprolactone polymer; and a copolymer of these. Preferred are a polymer of a dicarboxylic acid (an aromatic dicarboxylic acid such as phthalic acid or isophthalic acid, or an unsaturated aliphatic dicarboxylic acid such as maleic acid) and an aliphatic diol having 2 to 12 carbon atoms; and a polymer of a dicarboxylic acid (a saturated aliphatic dicarboxylic acid such as adipic acid or sebacic acid) and an aliphatic diol having 2 to 12 carbon atoms.

Examples of the polycarbonate include a polycarbonate derived from an aliphatic diol having 2 to 18 carbon atoms, a polycarbonate derived from bisphenol A, and a polycarbonate derived from a C2 to C18 aliphatic diol and bisphenol A. Preferred are a polycarbonate derived from an aliphatic diol having 2 to 12 carbon atoms, a polycarbonate derived from bisphenol A, and a polycarbonate derived from a C2 to C12 aliphatic diol and bisphenol A.

Examples of the polyurethane include a polymer of a C2 to C18 aliphatic diol and a C1 to C18 diisocyanate. Preferred is a polymer of a C2 to C12 aliphatic diol and a C1 to C12 diisocyanate.

Examples of the polyether include polyethylene glycol, polypropylene glycol, polybutylene glycol, and poly(1-methylbutylene glycol).

Examples of the poly-conjugated diene and hydrogenated poly-conjugated diene include 1,4-polybutadiene, 1,2-polybutadiene, polyisoprene, poly(butadiene-isoprene), poly(butadiene-styrene), poly(isoprene-styrene), poly-farnesene, and hydrogenated products of these.

Among these structures, polyester is preferred in view of providing desirable toughness. In view of providing desirable water resistance and toughness, it is preferable that the polyester structure contain a diol moiety having a structure derived from a C4 to C18 aliphatic diol unit having a branched structure; and a phthalic acid ester. In view of providing desirable water resistance and fabricability, it is preferable that the polyester structure contain a polyol moiety having a structure derived from a C4 to C12 aliphatic diol unit having a branched structure; and a sebacic acid ester. A polyol having these polymer backbones can be used for the production of urethanized (meth)acrylic compound (C1).

Examples of the compound having an isocyanate group include hexamethylene diisocyanate (HDI), tolylene diisocyanate (TDI), xylylene diisocyanate (XDI), diphenylmethane diisocyanate (MDI), isophorone diisocyanate (IPDI), trimethylhexamethylene diisocyanate (TMHMDI), tricyclodecane diisocyanate (TCDDI), and adamantane diisocyanate (ADI).

Examples of the (meth)acrylic compound having a hydroxyl group include:

hydroxy (meth)acrylate compounds, for example, such as 2-hydroxyethyl (meth)acrylate, 2-hydroxypropyl (meth)acrylate, 2-hydroxybutyl (meth)acrylate, 6-hydroxyhexyl (meth)acrylate, 10-hydroxydecyl (meth)acrylate, 3-chloro-2-hydroxypropyl (meth)acrylate, 2-hydroxy-3-phenoxypropyl (meth)acrylate, glycerin mono(meth)acrylate, 2-hydroxy-3-acryloyloxypropyl (meth)acrylate, 2,2-bis[4-[3-(meth)acryloyloxy-2-hydroxypropoxy]phenyl]propane, 1,2-bis[3-(meth)acryloyloxy-2-hydroxypropoxy]ethane, pentaerythritol tri(meth)acrylate, and tri or tetra(meth)acrylates of dipentaerythritol; and hydroxy (meth)acrylamide compounds, for example, such as N-hydroxyethyl (meth)acrylamide, and N,N-bis(2-hydroxyethyl)(meth)acrylamide.

Examples of the C4 to C18 aliphatic diol unit having a branched structure include 2-methyl-1,3-propanediol, 2,2-diethyl-1,3-propanediol, 1,3-butanediol, 2-methyl-1,4-butanediol, neopentyl glycol, 3-methyl-1,5-pentanediol, 2-methyl-1,8-octanediol, 2,7-dimethyl-1,8-octanediol, 2-methyl-1,9-nonanediol, 2,8-dimethyl-1,9-nonanediol, 2-methyl-1,10-decanediol, 2,9-dimethyl-1,10-decanediol, 2-methyl-1,11-undecanediol, 2,10-dimethyl-1,11-undecanediol, 2-methyl-1,12-dodecanediol, 2,11-dimethyl-1,12-dodecanediol, 2-methyl-1,13-tridecanediol, 2,12-dimethyl-1, 13-tridecanediol, 2-methyl-1,14-tetradecanediol, 2,13-dimethyl-1,14-tetradecanediol, 2-methyl-1,15-pentadecanediol, 2,14-dimethyl-1,15-pentadecanediol, 2-methyl-1,16-hexadecanediol, and 2,15-dimethyl-1,16-hexadecanediol. In view of providing a resin composition for stereolithography having desirable curability and low viscosity, the polyol components used are preferably C5 to C12 aliphatic diols having a methyl-group side chain, for example, such as 2-methyl-1,4-butanediol, 3-methyl-1,5-pentanediol, 2-methyl-1,8-octanediol, 2,7-dimethyl-1,8-octanediol, 2-methyl-1,9-nonanediol, and 2,8-dimethyl-1,9-nonanediol. The polyol components are more preferably 2-methyl-1,4-butanediol, 3-methyl-1,5-pentanediol, 2-methyl-1,8-octanediol, and 2,7-dimethyl-1,8-octanediol, even more preferably 3-methyl-1,5-pentanediol, and 2-methyl-1,8-octanediol.

The addition reaction of the compound having an isocyanate group and the (meth)acrylic compound having a hydroxyl group can be performed following a known method, and the method is not particularly limited.

The urethanized (meth)acrylic compound (C1) produced is, for example, a product of a reaction of any combination of: a polyol having at least one structure selected from the group consisting of a polyester, a polycarbonate, a polyurethane, a polyether, a poly-conjugated diene, and a hydrogenated poly-conjugated diene; a compound having an isocyanate group, and a (meth)acrylic compound having a hydroxyl group.

In view of viscosity and strength, the urethanized (meth)acrylic compound (C1) has a weight-average molecular weight (Mw) of preferably 1,000 to 30,000, more preferably 1,500 to 15,000, even more preferably 1,500 to 9,000, yet more preferably 1,500 to 8,000, particularly preferably 2,000 to 5,000, most preferably 2,500 to 4,500. As used herein, "weight-average molecular weight (Mw)" means a weight-average molecular weight in terms of polystyrene as determined by gel permeation chromatography (GPC).

The content of urethanized (meth)acrylic compound (C1) in a resin composition for stereolithography of the present invention is preferably 1 to 69 mass % of the total amount of the polymerizable compounds. In view of improving fabricability and providing a cured product having improved flexibility, toughness, and water resistance, the content of urethanized (meth)acrylic compound (C1) is more preferably 5 to 60 mass %, even more preferably 10 to 50 mass %.

A resin composition for stereolithography of the present invention may comprise polymerizable compounds other than the polymerizable compound (A) and polymerizable compound (C). However, the polymerizable compounds may consist essentially of polymerizable compound (A) and polymerizable compound (C). Here, the polymerizable compounds consisting essentially of polymerizable compound (A) and polymerizable compound (C) means that the content of polymerizable compounds other than polymerizable compound (A) and polymerizable compound (C) is less than 10.0 mass %, preferably less than 5.0 mass %, more preferably less than 1.0 mass %, even more preferably less than 0.1 mass %, particularly preferably less than 0.01 mass % relative to the total amount of the polymerizable compounds contained in the resin composition for stereolithography.

A preferred embodiment is, for example, a resin composition for stereolithography in which the polymerizable compounds consist essentially of polymerizable compound (A) and polymerizable compound (C), and in which the polymerizable compound (A) comprises only the monofunctional polymerizable monomer (A1). Another preferred embodiment is, for example, a resin composition for stereolithography in which the polymerizable compounds consist essentially of polymerizable compound (A) and polymerizable compound (C), and in which the polymerizable compound (A) comprises the monofunctional polymerizable monomer (A1) and the polyfunctional polymerizable monomer (A2), and the polymerizable compound (C) comprises only the urethanized (meth)acrylic compound (C1). Another preferred embodiment is, for example, a resin composition for stereolithography in which the polymerizable compounds consist essentially of the polymerizable compound (A) and the polymerizable compound (C), and in which the polymerizable compound (A) comprises the monofunctional polymerizable monomer (A1) and the polyfunctional polymerizable monomer (A2), and the polymerizable compound (C) comprises the urethanized (meth)acrylic compound (C1) and the (meth)acrylic acid ester compound (C2). Another preferred embodiment is, for example, a resin composition for stereolithography that comprises the polymerizable compound (A) and the photopolymerization initiator (B), and has a tan δ at 37° C. of 0.3 or less after cure, and that is essentially free of a (meth)acrylamide urethane oligomer. In such a preferred embodiment, the content of (meth)acrylamide urethane oligomer is meant to be less than 1.0 mass %, preferably less than 0.1 mass %, more preferably less than 0.01 mass %. In all of the preferred embodiments above, the amount and type of each component may be varied as appropriate, and changes such as addition and deletion may be made to any desired components following the descriptions of this specification. In all of the preferred embodiments above, the compositions and the properties (e.g., tan δ values at 37° C. and 200° C. after cure, a peak top temperature of tan δ at 37° C., flexural modulus, and flexural strength) of the resin composition for stereolithography may have values different from the values specified above, and the values may be combined as appropriate.

A resin composition for stereolithography of the present invention is not particularly limited, and can be produced according to known methods, as long as it contains the polymerizable compound (A) and the photopolymerization initiator (B), and satisfies a specific range of tan δ at 37° C. after cure.

A resin composition for stereolithography of the present invention may contain a polymerization accelerator to improve photocurability, provided that addition of a polymerization accelerator is not against the intent and purpose of the present invention. Examples of the polymerization accelerator include amine compounds, for example, tertiary amines such as ethyl 4-(N,N-dimethylamino)benzoate, methyl 4-(N,N-dimethylamino)benzoate, n-butoxyethyl 4-(N,N-dimethylamino)benzoate, 2-(methacryloyloxy)ethyl 4-(N,N-dimethylamino)benzoate, 4-(N,N-dimethylamino)benzophenone, and butyl 4-(N,N-dimethylamino)benzoate. The polymerization accelerator may be used alone, or two or more thereof may be used in combination. In view of imparting desirable curability to the resin composition for stereolithography, preferred is at least one selected from the group consisting of ethyl 4-(N,N-dimethylamino)benzoate, n-butoxyethyl 4-(N,N-dimethylamino)benzoate, and 4-(N,N-dimethylamino)benzophenone.

The resin composition for stereolithography of the present invention may further comprise a filler mixed therein to adjust paste properties or to alter the surface properties or strength of a cured product of the resin composition for stereolithography. Examples of the filler include organic fillers, inorganic fillers, and organic-inorganic composite fillers. The filler may be used alone, or two or more thereof may be used in combination.

Examples of the organic fillers include polymethyl methacrylate, polyethyl methacrylate, methyl methacrylate-ethyl methacrylate copolymer, crosslinked polymethyl methacrylate, crosslinked polyethyl methacrylate, polyesters, polyamides, polycarbonates, polyphenylene ethers, polyoxymethylene, polyvinyl chloride, polystyrene, polyethylene, polypropylene, chloroprene rubber, nitrile rubber, ethylene-vinyl acetate copolymer, styrene-butadiene copolymer, acrylonitrile-styrene copolymer, and acrylonitrile-styrene-butadiene copolymer. These may be used alone, or two or more thereof may be used in combination. The organic filler is not limited to a particular shape, and may be appropriately selected from organic fillers of different particle diameters. In view of properties such as the ease of handling and mechanical strength of the resin composition for stereolithography obtained, the average particle diameter of the organic filler is preferably 0.001 to 50 µm, more preferably 0.001 to 10 µm, even more preferably 0.001 to 1.0 µm.

Examples of the materials of the inorganic fillers include quartz, silica, alumina, silica-titania, silica-titania-barium oxide, silica-zirconia, silica-alumina, lanthanum glass, borosilicate glass, soda glass, barium glass, strontium glass, glass-ceramic, aluminosilicate glass, barium boroaluminosilicate glass, strontium boroaluminosilicate glass, fluoroaluminosilicate glass, calcium fluoroaluminosilicate glass, strontium fluoroaluminosilicate glass, barium fluoroaluminosilicate glass, and strontium calcium fluoroaluminosilicate glass. These may be used alone, or two or more thereof may be used in combination. The inorganic filler is not limited to a particular shape, and may be appropriately selected from inorganic fillers of different shapes, such as irregularly shaped fillers, and spherical fillers. In view of properties such as the ease of handling and mechanical strength of the resin composition for stereolithography obtained, the average particle diameter of the inorganic filler is preferably 0.001 to 50 µm, more preferably 0.001 to 10 µm, even more preferably 0.001 to 1.0 µm.

In order to adjust the flowability of the resin composition for stereolithography, the inorganic filler may be used after an optional surface treatment with a known surface treatment agent such as a silane coupling agent. Examples of the surface treatment agent include vinyltrimethoxysilane, vinyltriethoxysilane, vinyltrichlorosilane, vinyl tri(β-methoxyethoxy)silane, γ-methacryloyloxypropyltrimethoxysilane, 8-methacryloyloxyoctyltrimethoxysilane, 11-methacryloyloxyundecyltrimethoxysilane, γ-glycidoxypropyltrimethoxysilane, γ-mercaptopropyltrimethoxysilane, and γ-aminopropyltriethoxysilane.

The organic-inorganic composite filler used in the present invention is a filler obtained by adding a monomer component to the inorganic filler, polymerizing the mixture in paste form, and pulverizing the polymerized filler. The organic-inorganic composite filler may be, for example, a TMPT filler (a filler obtained by mixing trimethylolpropane trimethacrylate and a silica filler, and pulverizing the mixture after polymerization). The shape of the organic-inorganic composite filler is not particularly limited, and may be determined by appropriately selecting the particle size of the filler. In view of properties such as the ease of handling and mechanical strength of the resin composition for stereolithography obtained, the organic-inorganic composite filler has an average particle diameter of preferably 0.001 to 50 µm, more preferably 0.001 to 10 µm, even more preferably 0.001 to 1.0 µm.

In this specification, the average particle diameter of filler means an average primary particle diameter, and can be determined using a laser diffraction scattering method or by observing particles with an electron microscope. Specifically, a laser diffraction scattering method is more convenient for the measurement of particles having a particle size of 0.1 µm or more, whereas electron microscopy is a more convenient method of particle size measurement for ultrafine particles of less than 0.1 µm. Here, 0.1 µm is a measured value by a laser diffraction scattering method.

As a specific example of a laser diffraction scattering method, the particle size may be measured by volume using, for example, a laser diffraction particle size distribution analyzer (SALD-2300, manufactured by Shimadzu Corporation) with a 0.2% sodium hexametaphosphate aqueous solution used as dispersion medium.

In electron microscopy, for example, particles may be photographed with an electron microscope (Model S-4000, manufactured by Hitachi), and the size of particles (at least 200 particles) observed in a unit field of the captured image may be measured using image-analyzing particle-size-distribution measurement software (Macview, manufactured by Mountech Co., Ltd.). Here, the particle diameter is determined as an arithmetic mean value of the maximum and minimum lengths of particles, and the average primary particle diameter is calculated from the number of particles and the particle diameter.

A resin composition for stereolithography of the present invention may comprise a polymer to alter properties such as flexibility and flowability, provided that addition of a polymer is not against the intent and purpose of the present invention. Examples of polymers that may be added in the present invention include natural rubber, synthetic polyisoprene rubber, liquid polyisoprene rubber, hydrogenated products of these, polybutadiene rubber, liquid polybutadiene rubber, hydrogenated products of these, styrene-butadiene rubber, chloroprene rubber, ethylene-propylene rubber, acryl rubber, isoprene-isobutylene rubber, acrylonitrile-butadiene rubber, and styrene elastomers. Specific examples of other polymers that may be added in the present invention include a polystyrene-polyisoprene-polystyrene block copolymer, a polystyrene-polybutadiene-polystyrene block copolymer, a poly(a-methylstyrene)-polybutadiene-poly(a-methylstyrene) block copolymer, a poly(p-methylstyrene)-polybutadiene-poly(p-methylstyrene) block copolymer, and hydrogenated products of these.

A resin composition for stereolithography of the present invention may optionally comprise a softener. Examples of the softener include petroleum-base softeners such as paraffinic, naphthenic, and aromatic process oils, and vegetable oil-base softeners such as paraffin, peanut oil, and rosin. These softeners may be used alone, or two or more thereof may be used in combination. The softener content is not particularly limited, provided that it is not against the intent and purpose of the present invention. Typically, the softener content is at most 200 parts by mass, preferably at most 100 parts by mass relative to total 100 parts by mass of the polymerizable compounds.

A resin composition for stereolithography of the present invention may contain a chemical polymerization initiator to improve curability, provided that it is not against the intent and purpose of the present invention. Preferred as chemical polymerization initiators are organic peroxides and azo compounds. The organic peroxides and azo compounds used as chemical polymerization initiators are not particularly limited, and may be known compounds. Typical examples of organic peroxides include ketone peroxide, hydroperoxides, diacyl peroxides, dialkyl peroxides, peroxyketals, peroxyesters, and peroxydicarbonates.

A resin composition for stereolithography of the present invention may comprise a known stabilizer, in order to inhibit deterioration, or to adjust photocurability. Examples of such stabilizers include polymerization inhibitors, ultraviolet absorbers, and antioxidants. The stabilizer may be used alone, or two or more thereof may be used in combination.

Examples of the polymerization inhibitors include hydroquinone, hydroquinone monomethyl ether, dibutylhydroquinone, dibutylhydroquinone monomethyl ether, 4-t-butyl catechol, 2-t-butyl-4,6-dimethylphenol, 2,6-di-t-butylphenol, and 3,5-di-t-butyl-4-hydroxytoluene. The content of polymerization inhibitor is preferably 0.001 to 5.0 parts by mass, more preferably 0.01 to 5.0 parts by mass, even more preferably 0.1 to 4.5 parts by mass relative to total 100 parts by mass of the polymerizable compounds.

A resin composition for stereolithography of the present invention may comprise a known additive, in order to adjust shades or paste properties. Examples of such additives include colorants (pigments, dyes), organic solvents, and thickeners. The additive may be used alone, or two or more thereof may be used in combination.

A resin composition for stereolithography of the present invention enables easy stereolithographical fabrication (particularly by bottom-up vat stereolithography), and can produce an object having desirable strain recovery, desirable toughness, and desirable water resistance. A resin composition for stereolithography of the present invention is also applicable to inkjet stereolithography. A resin composition for stereolithography of the present invention, and a cured product thereof can therefore be used in applications where such advantages can be exploited, for example, such as intraoral use as a dental material or a material for treating sleep disorders. In the case of a dental material, a resin composition for stereolithography of the present invention is most suited particularly as a dental mouthpiece (e.g., orthodontic aligners, night guards, and dental splints), and a denture base material (non-clasp denture). Aside from therapeutic applications such as dental mouthpieces and denture base materials, a resin composition for stereolithography of the present invention is also suited as a mouthguard used for protection against external forces in sport activities. In the case of a material for treating sleep disorders, a resin composition for stereolithography of the present invention is most suited particularly as an appliance (oral appliance (OA)) for treating sleep apnea. A cured product using a resin composition for stereolithography of the invention may have a shape that depends on intended use. In a resin composition for stereolithography of the present invention, the type and content of each component (polymerizable compound (A), photopolymerization initiator (B), polymerizable compound (C), and other components such as a polymerization accelerator, a filler, a polymer, a softener, a stabilizer, and an additive) may be optionally adjusted according to use (for example, as a dental mouthpiece or a denture base material).

A resin composition for stereolithography of the present invention can be used in a wide variety of applications by taking advantage of its properties, specifically, the superior fabrication accuracy due to the low rate of volume shrinkage upon curing with light, and the ability to produce cured products of desirable properties, for example, three-dimensional objects having desirable strain recovery, toughness, and water resistance. For example, a resin composition for stereolithography of the present invention can be used for stereolithographical production of a three-dimensional object, and production of various three-dimensional objects, for example, a film-shaped object or a molding produced by a technique such as flow casting or casting, and molds to be coated with coatings and molds used for vacuum molding.

A resin composition for stereolithography of the present invention is particularly suited for stereolithography such as above. In stereolithography applications, a resin composition for stereolithography of the present invention enables smooth production of a three-dimensional object having desirable toughness and water resistance while ensuring superior fabrication accuracy with a maintained low rate of volume shrinkage at the time of curing with light.

Another embodiment of the present invention is a method for producing a three-dimensional object by stereolithography using any of the resin compositions for stereolithography described above. The stereolithography method is preferably bottom-up vat stereolithography.

In stereolithography (particularly, bottom-up vat stereolithography) using a resin composition for stereolithography of the present invention, any known stereolithography method and device may be used (for example, a stereolithography device such as the DigitalWax 020D manufactured by DWS). The stereolithography method and device are not particularly limited. However, in view of the viscosity of the resin composition for stereolithography, a bottom-up stereolithography device (a bottom-up vat stereolithography device) is particularly suited for a resin composition for stereolithography of the present invention. In the present invention, the light energy used to cure the resin is preferably an active energy beam. As used herein, "active energy beam" means an energy ray capable of curing a resin composition for stereolithography, and includes, for example, ultraviolet light, an electron beam, X-rays, radiant rays, and high-frequency waves. For example, the active energy beam may be ultraviolet light of 300 to 420 nm wavelengths. The light source of active energy beam may be, for example, a laser such as an Ar laser or a He—Cd laser; or a lighting such as a halogen lamp, a xenon lamp, a metal halide lamp, an LED, a mercury lamp, and a fluorescent lamp. Lasers are particularly preferred. When the light source is a laser, the fabrication time can be reduced by increasing the energy level, and a three-dimensional object of high shape precision can be obtained by taking advantage of the desirable convergence of a laser beam.

Stereolithography using a resin composition for stereolithography of the present invention may use any known method and any known stereolithography system, and the method and device are not particularly limited, as noted above. However, a typical example of a stereolithography method preferred for use in the present invention is a method that produces a three-dimensional object of the desired shape through a repeated procedure that includes a step of forming a cured layer by selectively applying an active energy beam to the resin composition for stereolithography to obtain a cured layer having a desired pattern, and a step of continuously forming another cured layer by similarly applying an active energy beam to a newly supplied, uncured liquid resin composition for stereolithography. The resulting three-dimensional object may be used as it is, or may be used after improving mechanical characteristics, shape stability, or other properties by, for example, post-curing the product under applied light or heat.

A cured product of a resin composition for stereolithography of the present invention has a flexural modulus in a range of preferably 0.3 to 3.0 GPa, more preferably 0.5 to 2.5 GPa, even more preferably 0.8 to 2.0 GPa. With a flexural modulus of 3.0 GPa or less, a cured product can have softness, which makes the cured product, when used as a dental mouthpiece for example, more comfortable to wear by allowing it to more easily conform to the teeth. The cured product also becomes less likely to come off during sleep such as in sleep bruxism (clenching). A cured product of a resin composition for stereolithography of the present invention has a flexural strength of preferably 30 MPa or more, more preferably 40 MPa or more, even more preferably 50 MPa or more.

A three-dimensional object obtained by stereolithography is not limited to a particular structure, shape, or size, and these may be decided according to use. Typical examples of areas to which the stereolithography of the present invention is applicable include production of various models and molds, including, for example, models for assessing external designs in a designing process; models for checking functions of components and parts; resin molds for making molds; base models for making dies; and direct molds for prototype dies. More specifically, the stereolithography of the present invention is applicable to, for example, production of models or work models for precision components and parts, electrical and electronic components, furniture, architectural structures, automobile parts, various containers and vessels, castings, dies, and matrices.

EXAMPLES

The following describes the present invention in greater detail by way of Examples. It should be noted, however, that the present invention is in no way limited by the following Examples, and various changes may be made by a person with ordinary skill in the art within the technical idea of the present invention.

The components used for the resin compositions for stereolithography according to Examples and Comparative Examples are presented below, along with the abbreviations used.

Monofunctional Polymerizable Monomer (A1)
  PMPMA: Pentamethyl piperidinyl methacrylate (manufactured by ADEKA CORPORATION; a liquid; a Tg of homopolymer is 105° C.)
  ACMO: N-Acryloylmorpholine (manufactured by KJ Chemicals Corporation; a liquid; a Tg of homopolymer is 145° C.)
Polyfunctional Polymerizable Monomer (A2)
  TCDDMA: Tricyclodecane dimethanol diacrylate (manufactured by TOMOE Engineering Co., Ltd.; a liquid; a Tg of homopolymer is 214° C.)
  THIA: Tris(2-hydroxyethyl)isocyanurate triacrylate (manufactured by TOMOE Engineering Co., Ltd.; a solid; a Tg of homopolymer is 272° C.)
Photopolymerization Initiator (B)
  TPO: 2,4,6-Trimethylbenzoyldiphenylphosphine oxide
  BAPO: Bis(2,4,6-trimethylbenzoyl)phenylphosphine oxide
Polymerizable Compound (C)
Urethanized (meth)acrylic Compound (C1)
  Urethanized (meth)acrylic compounds (C1)-1 and (C1)-2: urethanized (meth)acrylic compounds (C1) produced in Synthesis Examples 1 and 2 below.
(meth)acrylic Acid Ester Compound (C2)
  POBA: m-Phenoxybenzylacrylate (manufactured by Kyoeisha Chemical Co., Ltd.; a colorless transparent liquid; a Tg of homopolymer is −35° C.)
Polymerization Inhibitor
  BHT: 3,5-Di-t-butyl-4-hydroxytoluene Synthesis Example 1

Production of Urethanized (meth)acrylic Compound (C1)-1

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 2,500 g of a polyester polyol (Kuraray Polyol® P-2050 manufactured by Kuraray Co., Ltd.; a polyol of sebacic acid and 3-methyl-1,5-pentanediol; weight-average molecular weight Mw: 2,000) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (C1)-1. By GPC analysis, the weight-average molecular weight Mw of urethanized (meth)acrylic compound (C1)-1 was found to be 2,600. The cured product had a glass transition temperature of −30° C. (Tg of a homopolymer of urethanized (meth)acrylic compound (C1)-1).

Synthesis Example 2

Production of Urethanized (meth)acrylic Compound (C1)-2

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 2,500 g of a polyester polyol (Kuraray Polyol® P-2030 manufactured by Kuraray Co., Ltd.; a polyol of isophthalic acid and 3-methyl-1,5-pentanediol; weight-average molecular weight Mw: 2,000) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (C1)-2. By GPC analysis, the weight-average molecular weight Mw of urethanized (meth)acrylic compound (C1)-2 was found to be 2,700. The cured product had a glass transition temperature of 30° C. (Tg of a homopolymer of urethanized (meth)acrylic compound (C1)-2).

Examples 1 to 5 and Comparative Examples 1 to 4

The components were mixed at an ordinary temperature (20° C.±15° C.; JIS (Japanese Industrial Standards) Z 8703: 1983) in the amounts shown in Tables 1 and 2 to prepare pastes representing resin compositions for stereolithography according to Examples 1 to 5 and Comparative Examples 1 to 4.

Fabricability

The resin compositions for stereolithography according to Examples and Comparative Examples were each fabricated into a specimen measuring 3.3 mm in thickness, 10.0 mm in width, and 64 mm in length (n=5). The specimens were fabricated at a pitch of 50 μm with a laser scan rate of 4,300 mm/sec using a stereolithography device (DigitalWax® 020D, manufactured by DWS). The resin composition was determined as "Satisfactory" when it was fabricable into a sheet of the desired dimensions in all five specimens, and "Unsatisfactory" when the resin composition was not fabricable into the desired three-dimensional object in any of the five specimens. The specimens were used for the following evaluations.

Viscoelasticity (Tan δ at 37° C. and 200° C., and Peak Top Temperature of Tan δ)

The resin compositions for stereolithography according to Examples and Comparative Examples were each subjected to 2,000 flashes of light with a photoirradiator (Otoflash® G171 manufactured by EnvisionTEC) to fabricate a circular disc-shaped cured product measuring 25 mm in diameter and 1.0 mm in thickness. The cured product was then measured for tan δ at 37° C. and 200° C., and a peak top temperature of tan δ, using a dynamic viscoelasticity measurement device (rotary rheometer AR 2000, manufactured by TA Instruments Japan Inc.) under a 10N±1 N load (a force that holds the circular disc) with 0.1% displacement (torsional distance) at 1 Hz frequency. In view of producing desirable strain recovery, the preferred tan δ at 37° C. is 0.2 or less, more preferably 0.15 or less, even more preferably 0.1 or less. In view of the tendency to produce desirable strain recovery, the preferred tan δ at 200° C. is 0.5 or less, more preferably 0.4 or less, even more preferably 0.3 or less. In view of the tendency to produce desirable strain recovery, the preferred peak top temperature of tan δ is 60° C. or higher, more preferably 80° C. or higher, even more preferably 100° C. or higher.

Strain Recovery and Permanent Strain

A cured product of the resin composition for stereolithography according to each Example and Comparative Example was fabricated into a sheet-shaped cured product measuring 60 mm in length, 20 mm in width, and 1.0 mm in thickness, using a stereolithography device (DIGITALWAX® 020D, manufactured by DWS) at a pitch of 50 μm with a laser scan rate of 4,300 mm/sec. The cured product was then punched with a punching blade (dumbbell shaped, #8) according to the JIS K 6251:2010 specifications (Rubber, vulcanized or thermoplastics-Determination of tensile stress-strain properties) to prepare tensile test specimens (n=5). The specimens were used to evaluate permanent strain as an index of strain recovery. Specifically, the specimen was stretched 0.5 mm at a crosshead speed of 20 mm/min with a 10 mm distance set between the jigs, using a universal testing machine (EZ Test EZ-SX 500N; Shimadzu Corporation). The permanent strain at zero stress upon returning the crosshead at a crosshead speed of 10 mm/min was then measured. Tables 1 and 2 show mean values of the measured values. In this test, the preferred permanent strain is 0.1 mm or less, more preferably 0.075 mm or less, even more preferably 0.050 mm or less.

Toughness (Flexural Modulus, Flexural Strength, Displacement of Fracture Point)

A cured product of the resin composition for stereolithography according to each Example and Comparative Example was fabricated into a specimen at a pitch of 50 μm with a laser scan rate of 4,300 mm/sec. Here, the specimen is the same specimen used for the evaluation of fabricability, and has the same dimensions specified by JIS T 6501:2012 (Acrylic Resin for Denture Base); 64.0 mm in length, 10.0 mm in width, and 3.3 mm in thickness). After 1 day of storage in air, the specimen was subjected to a flexural strength test to determine the initial value. Specifically, a flexural strength test was conducted at a span length of 50 mm with a crosshead speed of 5 mm/min, using a universal testing machine (Shimadzu Corporation, Autograph AG-I, 100 kN) (n=5). Tables 1 and 2 show mean values of the measured values. The preferred range of specimen's flexural modulus is 0.3 to 3.0 GPa, more preferably 0.5 to 2.5 GPa, even more preferably 0.8 to 2.0 GPa. The preferred flexural strength is 30 MPa or more, more preferably 40 MPa or more, even more preferably 50 MPa or more. As for the displacement of fracture point, it is desirable to have no fracture. In the evaluation of displacement of fracture point, the flexibility was determined as being desirable (Satisfactory) when the specimen did not have a fracture at the end of testing, or when a fracture occurred with a displacement of 20 mm or more, moderate (Acceptable) when a fracture occurred with a displacement of more than 10 mm and less than 20 mm, and poor (Unsatisfactory) when a fracture occurred with a displacement of 10 mm or less. The specimens were determined as having passed the test when the result was Acceptable or Satisfactory.

Water Resistance

The resin composition according to each Example and Comparative Example was fabricated into a cured product in the same manner as for the cured product fabricated for the measurement of toughness. The cured product was immersed in 37° C. water for 168 hours, and measured for flexural strength in the same manner as in the flexural strength test above (n=5). The rate of change (rate of decrease) of flexural strength after 168 hours in 37° C. water was then calculated relative to the initial flexural strength taken from the result of the flexural strength measurement conducted for the evaluation of toughness. Water resistance is desirable when the rate of change (rate of decrease) of flexural strength is 10% or less, and even more desirable when the rate of change is 7% or less. Tables 1 and 2 show means values of the calculated values. In Tables 1 and 2, "Flexural strength after Immersion" represents the flexural strength after 168 hours in 37° C. water.

Rate of change (rate of decrease) of flexural strength (%)=[{initial flexural strength (MPa)−flexural strength after 168 hours in 37° C. water (MPa)}/initial flexural strength (MPa)]×100

TABLE 1

|  |  |  | Example 1 | Example 2 | Example 3 | Example 4 | Example 5 |
|---|---|---|---|---|---|---|---|
| Components (parts by mass) | (A1) | PMPMA | 60 | 60 | 30 | 60 | 60 |
|  |  | ACMO | 10 |  |  |  |  |
|  | (A2) | TCDDMA |  | 10 | 10 | 10 | 10 |
|  |  | THIA |  |  | 10 | 10 | 10 |
|  | (B) | TPO | 2.5 | 2.5 | 2.5 | 2.5 | 2.5 |
|  |  | BAPO |  | 0.5 |  | 0.5 | 0.5 |
|  | (C) | POBA |  |  | 10 |  |  |
|  |  | Urethanized (meth)acrylic compound (C1)-1 |  |  |  |  | 20 |
|  |  | Urethanized (meth)acrylic compound (C1)-2 | 30 | 30 | 40 | 20 |  |
|  |  | BHT | 1.0 | 1.0 | 1.0 | 1.0 | 1.0 |
| Fabricability |  |  | Satisfactory | Satisfactory | Satisfactory | Satisfactory | Satisfactory |
| Viscoelasticity |  | Tanδ at 37° C. | 0.13 | 0.09 | 0.18 | 0.04 | 0.11 |
|  |  | Tanδ at 200° C. | 0.42 | 0.35 | 0.28 | 0.38 | 0.32 |
|  |  | Peak top temperature of tanδ (° C.) | 82 | 90 | 70 | 108 | 86 |
| Strain recovery |  | Permanent strain (mm) | 0.070 | 0.056 | 0.080 | 0.045 | 0.064 |
| Toughness |  | Flexural modulus (GPa) | 1.3 | 1.8 | 1.0 | 1.9 | 1.5 |
|  |  | Flexural strength (MPa) | 48 | 52 | 42 | 54 | 49 |
|  |  | Displacement of fracture point | Satisfactory | Acceptable | Satisfactory | Acceptable | Satisfactory |
| Water resistance |  | Flexural strength after immersion (MPa) | 44 | 49 | 38 | 53 | 49 |
|  |  | Rate of decrease (%) | 8.3 | 5.8 | 9.5 | 1.9 | 0 |

TABLE 2

|  |  |  | Comparative Example 1 | Comparative Example 2 | Comparative Example 3 | Comparative Example 4 |
|---|---|---|---|---|---|---|
| Components (parts by mass) | (A1) | PMPMA | 40 |  | 20 | 20 |
|  |  | ACMO |  | 40 |  |  |
|  | (A2) | TCDDMA |  |  | 10 | 10 |
|  |  | THIA |  |  |  | 10 |
|  | (B) | TPO | 2.5 | 2.5 | 2.5 | 2.5 |
|  |  | BAPO |  |  | 0.5 | 0.5 |
|  | (C) | POBA |  |  |  |  |
|  |  | Urethanized (meth)acrylic compound (C1)-1 |  | 60 |  | 60 |
|  |  | Urethanized (meth)acrylic compound (C1)-2 | 60 |  | 70 |  |
|  |  | BHT | 1.0 | 1.0 | 1.0 | 1.0 |
| Fabricability |  |  | Unsatisfactory | Satisfactory | Satisfactory | Satisfactory |
| Viscoelasticity |  | Tanδ at 37° C. | 0.76 | 1.2 | 0.38 | 0.63 |
|  |  | Tanδ at 200° C. | 0.59 | 0.64 | 0.62 | 0.58 |
|  |  | Peak top temperature of tanδ (° C.) | 52 | 20 | 55 | 20 |
| Strain recovery |  | Permanent strain (mm) |  | 0.152 | 0.118 | 0.143 |
| Toughness |  | Flexural modulus (GPa) |  | 0.5 | 0.7 | 0.8 |
|  |  | Flexural strength (MPa) |  | 26 | 28 | 32 |
|  |  | Displacement of fracture point |  | Satisfactory | Satisfactory | Acceptable |
| Water resistance |  | Flexural strength after immersion (MPa) |  | 11 | 23 | 30 |
|  |  | Rate of decrease (%) |  | 58 | 18 | 6.3 |

As shown in Tables 1 and 2, the resin compositions for stereolithography of Examples 1 to 5 had desirable fabricability, and the cured products were also desirable in terms of strain recovery, toughness, and water resistance. Particularly, the resin compositions for stereolithography according to Examples 1 to 5 were more desirable than the resin composition of Comparative Example 1 in terms of fabricability. The cured products of the resin compositions for stereolithography according to Examples 1 to 5 were more desirable than the cured products of the resin compositions according to Comparative Examples 2 to 4 in terms of strain recovery. The cured products of the resin compositions for stereolithography according to Examples 1 to 5 were also more desirable than the cured products of Comparative Examples 2 and 4 in terms of toughness and water resistance.

INDUSTRIAL APPLICABILITY

A resin composition for stereolithography of the present invention is easily fabricable, and can produce a cured product having desirable strain recovery, desirable toughness, and desirable water resistance. This makes a resin composition for stereolithography of the present invention suited for intraoral applications such as dental materials (particularly, dental mouthpieces and denture base materials, especially orthodontic aligners and non-clasp dentures), or materials for treating various types of sleep disorders (particularly, appliances for treating sleep apnea).

The invention claimed is:
1. A resin composition for stereolithography comprising 30 mass % to 90 mass %, based on a total mass % of all polymerizable compounds in said composition, of a polymerizable monomer (A) whose homopolymer has a glass transition temperature (Tg) of 80° C. or higher, and a photopolymerization initiator (B), said resin composition having a tan δ at 37° C. of 0.3 or less after cure.

2. The resin composition for stereolithography according to claim 1, wherein the resin composition has a tan δ with a peak top temperature of 60° C. or higher after cure.

3. The resin composition for stereolithography according to claim 1, further comprising a polymerizable compound (C) whose homopolymer has a glass transition temperature (Tg) of less than 37° C.

4. The resin composition for stereolithography according to claim 1, wherein the resin composition has a tan δ at 200° C. of 0.5 or less after cure.

5. The resin composition for stereolithography according to claim 1, wherein the polymerizable compound (A) comprises a monofunctional polymerizable monomer (A1).

6. The resin composition for stereolithography according to claim 5, wherein the monofunctional polymerizable monomer (A1) comprises a monofunctional (meth)acrylic acid ester compound and/or a monofunctional (meth)acrylamide compound.

7. The resin composition for stereolithography according to claim 6, wherein the monofunctional polymerizable monomer (A1) comprises a monofunctional (meth)acrylic acid ester compound, and the monofunctional (meth)acrylic acid ester compound comprises at least one selected from the group consisting of an aromatic ring-containing (meth) acrylic acid ester compound, an alicyclic (meth)acrylic acid ester compound, and a nitrogen atom-containing cyclic (meth)acrylic acid ester compound.

8. The resin composition for stereolithography according to claim 1, wherein the polymerizable monomer (A) comprises a polyfunctional polymerizable monomer (A2).

9. The resin composition for stereolithography according to claim 8, wherein the polyfunctional polymerizable monomer (A2) comprises an aliphatic polyfunctional polymerizable monomer.

10. The resin composition for stereolithography according to claim 8, wherein the polyfunctional polymerizable monomer (A2) comprises an alicyclic polyfunctional polymerizable monomer.

11. The resin composition for stereolithography according to claim 10, wherein the alicyclic polyfunctional polymerizable monomer comprises a tricyclodecane dimethanol di(meth)acrylate.

12. The resin composition for stereolithography according to claim 8, wherein the polyfunctional polymerizable monomer (A2) comprises a hetero ring-containing polyfunctional polymerizable monomer.

13. The resin composition for stereolithography according to claim 3, wherein the polymerizable compound (C) comprises a urethanized (meth)acrylic compound (C1).

14. The resin composition for stereolithography according to claim 13, wherein the urethanized (meth)acrylic compound (C1) is a (meth)acrylate comprising, per molecule,
at least one structure selected from the group consisting of
a polyester, a polycarbonate, a polyurethane, a polyether, a poly-conjugated diene, and a hydrogenated poly-conjugated diene; and
a urethane bond.

15. The resin composition for stereolithography according to claim 13, wherein the urethanized (meth)acrylic compound (C1) is a (meth)acrylate comprising, per molecule,
at least one polyol moiety selected from the group consisting of a polyester, a polycarbonate, a polyurethane, a polyether, a poly-conjugated diene, and a hydrogenated poly-conjugated diene each having a structure derived from a C4 to C18 aliphatic diol unit having a branched structure; and
a urethane bond.

16. A dental material comprising a cured product of the resin composition for stereolithography according to claim 1.

17. A dental mouthpiece comprising a cured product of the resin composition for stereolithography according to claim 1.

18. A denture base material comprising a cured product of the resin composition for stereolithography according to claim 1.

19. A material for treating sleep disorder, comprising a cured product of the resin composition for stereolithography according to claim 1.

20. A method, comprising stereolithographically producing a three-dimensional object with the resin composition for stereolithography according to claim 1.

21. The resin composition for stereolithography according to claim 1, further comprising a polymer selected from the group consisting of a polystyrene-polyisoprene-polystyrene block copolymer, a polystyrene-polybutadiene-polystyrene block copolymer, a poly(α-methylstyrene)-polybutadiene-poly(α-methylstyrene) block copolymer, a poly(p-methylstyrene)-polybutadiene-poly(p-methylstyrene) block copolymer, and hydrogenated products thereof.

* * * * *